United States Patent [19]

Hosoda et al.

[11] 4,073,762

[45] * Feb. 14, 1978

[54] AQUEOUS EPOXY RESIN PAINT COMPOSITION

[76] Inventors: Minoru Hosoda, No. 2473-89, Shimonagaya, Kohnan, Yokohama, Kanagawa; Eiichi Kasiwagi, 7-7-407 Zengyo-danchi, No. 3768-3, Fujisawa, Fujisawa, Kanagawa; Fumio Murayama, No. 95-3, Wada, Hodogaya, Yokohama, Kanagawa; Kohei Isayama, No. 20-41, 2-chome, Dai, Kamakura, Kanagawa, all of Japan

[ * ] Notice: The portion of the term of this patent subsequent to Sept. 28, 1993, has been disclaimed.

[21] Appl. No.: 666,453

[22] Filed: Mar. 12, 1976

Related U.S. Application Data

[62] Division of Ser. No. 509,315, Sept. 25, 1974, Pat. No. 3,983,056.

[30] Foreign Application Priority Data

Sept. 27, 1973 Japan ................................ 48-108808
Sept. 27, 1973 Japan ................................ 48-108809
Oct. 1, 1973 Japan ................................ 48-110393
Dec. 24, 1973 Japan ................................ 48-3633

[51] Int. Cl.$^2$ ............................................. C08L 61/06
[52] U.S. Cl. ........................... 260/29.3; 260/29.2 EP; 260/830 TW; 260/830 P
[58] Field of Search ....... 260/29.2 EP, 29.3, 830 TW, 260/830 P

[56] References Cited

U.S. PATENT DOCUMENTS

| 3,734,887 | 5/1973 | Schmitt et al. | 260/830 TW |
| 3,879,324 | 4/1975 | Timmons et al. | 260/29.2 EP |

*Primary Examiner*—J. Ziegler
*Attorney, Agent, or Firm*—Haseltine, Lake & Waters

[57] ABSTRACT

An aqueous epoxy resin paint composition comprising an epoxy resin emulsion formed by emulsifying a bisphenol type epoxy resin or a mixture of a bisphenol type epoxy resin with an epoxy resin having a compatibility with said bisphenol type epoxy resin and a structure similar to that of said bisphenol type epoxy resin but being quite different therefrom in a part of the structure in water with a polyoxyethylene benzylated phenyl ether having an HLB value of at least 15, and a cutting agent and, if desired, a pigment and other additives.

7 Claims, No Drawings

AQUEOUS EPOXY RESIN PAINT COMPOSITION

This is a division of application Ser. No. 509,315 filed 9/25/74 now U.S. Pat. No. 3,983,056 issued Sept. 28, 1976.

BACKGROUND OF THE INVENTION (1) Field of the Invention

This invention relates to an aqueous epoxy resin paint composition. More particularly, the invention relates to a room temperature drying epoxy resin emulsion comprising as the main ingredient an epoxy resin emulsifield in water by a non-ionic surface active agent and, incorporating therein, a curing agent and, if desired, a pigment and other additives.

(2) Description of the Prior Art

Recently, air pollution caused by solvents and the bad influence of solvents on the human body have become serious problems, and hence, the importance of aqueous paints is increasing. Various resin have heretofore been used for aqueous paints, and epoxy resins are often used in the field of primer paints in which such properties as rust-preventive property and chemical resistance are regarded as especially important.

In the art, the following aqueous epoxy resin compositions have heretofore been known. For example, a composition comprising (1) a polyepoxy resin and (2) a copolymer of an alkyl ester of an $\alpha$, $\beta$-ethylenically unsaturated monocarboxylic acid and an alkyl half ester of itaconic acid is known as an aqueous coating composition excellent in alkali resistance, adhesion and storage stability (U.S. Pat. No. 3,238,170). Further, an aqueous emulsion comprising an epoxy resin and a protein acting as protective colloid and an emulsion comprising a mixture of an amine-epoxy resin condensate and an epoxy resin are known in the art (U.S. Pat. No. 3,020,250 and U.S. Pat. No. 3,449,281).

Moreover, research work has heretofore been made on various emulsifiers for emulsifying epoxy resins in water. For example, in the art are known an aqueous emulsion of an epoxy resin in which a reaction product of a boric acid ester derived from boric acid with both an alkylene glycol and a $\beta$-dialkyl-substituted aminoalkanol is used as an emulsifier (U.S. Pat. No. 3,301,804), a polyepoxide emulsion for electro-deposition in which a polyepoxide is emulsified with an emulsifying agent of the phosphate ester type (U.S. Pat. No. 3,634,348), an epoxy resin emulsion for sizing glass fibers in which a cationic emulsifying agent selected from the group consisting of imidazolines and amides and a non-ionic emulsifying agent are used in combination (U.S. Pat. No. 3,249,412), and the like.

Also various curing agents for epoxy resin emulsion compositions are known in the art. For example, as curing agents for epoxy resin compositions, there can be mentioned a polyamide reaction product derived from a polymeric fatty and an aliphatic polyamine containing terminal amino groups (U.S. Pat. Nos. 2,811,495 and 2,899,397), a salted amine derived from a carboxylic acid having 1 to 8 carbon atoms and a tertiary amine (U.S. Pat. No. 3,640,926), a polyamide derived from a diamine and a dicarboxylic acid (U.S. Pat. No. 3,355,409), a phenol modified polyamine (U.S. Pat. No. 3,383,347), an amino-containing polyamide prepared by reacting a polyamine with a polymerized fatty acid (U.S. Pat. No. 3,324,041), and the like.

A bisphenol type epoxy resin is ordinarily used as a vehicle of an aqueous epoxy resin paint.

The bisphenol type epoxy resin, however, has the fatal defect that the epoxy resin is crystallized when it is stored for 3 months or longer especially at low temperatures. The cause of this undesired crystallization is not yet certain, but in view of the fact that a liquid epoxy resin having a narrow molecular weight distribution range is easily crystallized at low temperatures, it is considered that the crystallization is due to arrangement of molecules having the same structure. Once crystals are formed in the epoxy resin, they grow gradually and finally, they precipitate in the form of particles to opacify the liquid resin. This phenomenon is especially likely to occur if the paint is gradually cooled to about 0° C., and precipitated particles are dissolved again under heating. In short, this phenomenon is quite similar to the phenomenon in which inorganic salts are crystallized from aqueous solutions. Re-dissolving of crystals in an epoxy resin does not, in general, proceed at temperatures approximating room temperature. Accordingly, it is very difficult to restore the original state by allowing crystals in the epoxy resin to stand still as they are, and it is generally necessary to heat the crystal-containing paint to about 50° C. by external heating or the like. Furthermore, in the case of an aqueous epoxy resin paint, destruction of emulsion particles is caused to occur with advance of crystallization, and when destruction of emulsion particles occurs, it is impossible to restore the original state even by conducting heating afterwards. Therefore, an aqueous epoxy resin paint has a fatal defect that a once crystallized paint cannot be used any more.

The epoxy resin to be used as the main component of the vehicle has the foregoing defects, and in addition, an optimum curing agent for aqueous epoxy resin compositions has not been developed.

For instance, when a polyamide resing having a high amine value is used as the curing agent, the resulting composition is defective in that gelation does not occur even after the passage of pot life, and no satisfactory results are obtained when the curing agent of this type is employed.

More specifically, even if an ordinary polyamide resin is mixed with an epoxy resin and the resulting composition is applied to a substrate, since hardly any water is evaporated from the coating film under high-humidity conditions, almost no gelatin proceeds even after the passage of pot life but partial gelation alone occurs. In an extreme case, no uniform film is obtained but a powdery film is left. This is a defect observed when a polyamide is used as the curing agent. In other words, in the case of an aqueous epoxy resin paint, it is considered that if water is present in the coating film, the activity of the curing agent is reduced, and especially under high-humidity conditions, almost no water is evaporated from the coating film and hence, gelation does not occur even after the passage of pot life.

In general, an epoxy resin paint is used as a primer paint for use in coating bridges, tanks or the like. However, when it is applied to especially close surfaces or on the inner face of a tank or the ballast tank of a ship which is in the substantially sealed state, the abovementioned defect is brought about and a sufficiently cured film cannot be obtained.

A paint excellent in rust-preventive property and chemical resistance has heretofore been prepared by using a chromate type pigment in combination with an aqueous epoxy resin composition such as mentioned above. However, in this paint including a pigment of the chromate type, chromium ions are gradually dissolved out from the coating film and there is a risk of causing environmental pollution.

As in apparent from the foregoing, the conventional aqueous epoxy resin paints have various defects and when they are used as primer paints of the natural drying type, various problems result.

SUMMARY OF THE INVENTION

This invention relates to an aqueous epoxy resin composition in which the above-mentioned defects involved in conventional techniques are overcome.

Objects of this invention are as follows:

(1) To prevent crystallization in an aqueous epoxy resin paint during storage, especially at low temperatures.

(2) To improve the film-forming property under high-humidity conditions in an aqueous epoxy resin paint composition.

(3) To provide an aqueous epoxy resin paint that can give a film excellent in corrosion resistance and chemical resistance.

(4) To improve chemical and physical properties in a film formed from an aqueous epoxy resin paint.

More specifically, in accordance with this invention, there is provided an aqueous epoxy resin composition characterized in that (I) a resinous component comprising (A) 98 to 50% by weight of a bisphenol type epoxy resin and (B) 2 to 50% by weight of at least one member selected from novolak type epoxy resins, epoxy resins of the dimer acid type, epoxy resins of the trimer acid type and methylsubstituted bisphenol epoxy resins is used; (II) a nonionic surface active agent having an HLB (hydrophiliclipophilic balance) value of at least 15, especially a polyoxyethylene benzylated phenyl ether, is used as an emulsifier; (III) a curing agent composed of a polyamide resin derived from a dimer acid and a polyether diamine or a mixture of said polyamide resin with an aromatic amine compound is used; and that (IV) at least one member selected from molybdic acid salts or strontium, calcium, potassium, iron (divalent), barium and ammonium is used as an anticorrosive pigment.

DETAILED DESCRIPTION OF THE INVENTION

The bisphenol type epoxy resin (A) to be used in this invention is an epoxy resin obtained by condensation between bisphenol A [2,2-bis(4'hydroxyphenyl)-propane] and epichlorohydrin, and is commercially available. Commercially available bisphenol type epoxy resins are liquid or solid and have a molecular weight of about 350 to about 3750 and an epoxy equivalent of about 180 to about 3500. Typical instances of these commercially available bisphenol type epoxy resins are as follows:

(1) Epikote 815, Epikote 827, Epikote 834, Epikote 1001, Epikote 1004, Epikote 1007 and Epikote 1009 (trademarks for products manufactured by Shell Chemical Co.)

(2) DER 330, DER 331, DER 334, DER 337, DER 661, DER 664, DER 667 and DER 669 (trademarks for products manufactured by Dow Chemical Co.)

(3) Araldite GY250, Araldite GY252, Araldite GY260, Araldite GY280, Araldite GY6071, Araldite GY6084, Araldite GY6097 and Araldite GY6099 (trademarks for products manufactured by Ciba Limited)

(4) ERL 2774 and ERL 2795 (trademarks for products manufactured by Union Carbide Corporation)

(5) Epiclon 850 (trademark for product manufactured by Dainippon Ink and Chemicals Incorp.)

These commercially available bisphenol type epoxy resins can be used singly, or mixtures of two or more of them can also be employed.

This bisphenol type epoxy resin is used as a vehicle. Use of a liquid epoxy resin is preferred because it is readily emulsified, but when the bisphenol type epoxy resin is solid, it can be emulsified or dispersed in water by mixing it with other liquid epoxy resin to dissolve it or by melting it under heating.

In this invention, in combination with the above bisphenol type epoxy resin (A) is used an additive resin (B) selected from the group consisting of (1) novolak type epoxy resins, (2) epoxy resins of the dimer acid or trimer acid type and (3) methyl-substituted bisphenol epoxy resins.

As the novolak type resin, there can be used those having the following structure:

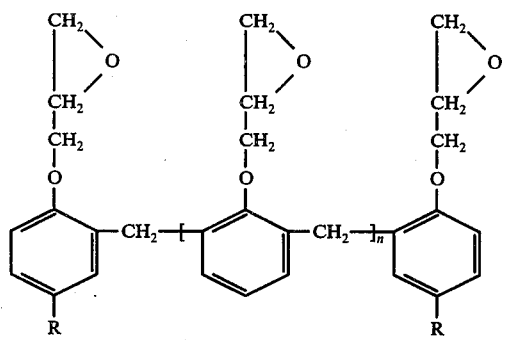

wherein $n$ is a number of from 0 to 2 and R stands for a hydrogen atom or a methyl, ethyl or propyl group.

As commercially available products of such novolak type resin (1), there can be mentioned Epikote 152 (product of Shell Chemical Co. having an epoxy equivalent of 172–179), Epikote 154 (product of Shell Chemical Co. having an epoxy equivalent of 176–181), DEN 431 l(product of Dow Chemical Co. having an epoxy equivalent of 172–179), DEN 438 (product of Dow Chemical Co. having an epoxy equivalent of 175–182), EPN 1138 (product of Ciba Limited having an epoxy equivalent of 172–179), etc. These resins are generally prepared by reacting a novolak type phenolic acid-formaldehyde resin with epichlorohydrin.

The dimer acid or trimer acid type epoxy resin (2) is usually prepared by reacting a dimer or trimer acid with epichlorohydrin (the preparation process is disclosed in, for example, Japanese Patent Publication No. 7454/62 published on July 7, 1962 by Shell International Research Maatochappij N.V., Netherland), and as commercially available products of the epoxy resin of this type, there can be mentioned, for example, Epikote 871 (product of Shell Chemical Co. having an epoxy equivalent of 390–470) and Epikote 872 (product of Shell Chemical Co. having an epoxy equivalent of 600–700).

The methyl-substituted bisphenol epoxy resin (3) to be used in this invention is a resin having the following structure:

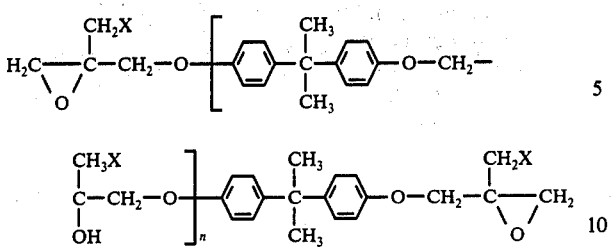

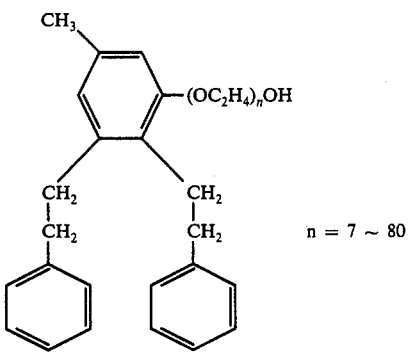

Wherein $n$ is 0 to 3 and X is hydrogen or chlorine. The epoxy resin (3) is prepared by condensation of β-methyl epichlorohydrin or β-chloromethyl epichlorohydrin with bisphenol-A. The preparation process is disclosed in, for example, U.S. Pat. No. 3,553,165 (Patented on Jan. 5, 1971 by Chiyoda Kako Kensetsu Kabushiki Kaisha).

As a commercially available product of the resin of this type, there can be mentioned, for example, Epiclon 800 (product of Dainippon Ink and Chemicals Incorp. having an epoxy equivalent of 195-225).

In this invention, as one means for attaining the object of prevention of crystallization there can be adopted combined use of the above mentioned bisphenol type epoxy vehicle resin with at least one member selected from the foregoing resins (1) to (3), each of which has a compatibility with the vehicle resin and a structure similar to that of the vehicle resin but is different therefrom in a part of the structure.

The additive epoxy resin (1), (2) or (3) is incorporated in the bisphenol type epoxy resin in such an amount that the additive resin accounts for 2 to 50% by weight of the sum of the bisphenol type epoxy resin and the additive epoxy resin. When the amount of the additive epoxy resin (1), (2) or (3) is less than 2% by weight, no substantial effect of preventing crystallization can be obtained, and when the amount of the additive resin exceeds 50% by weight, the saline resistance, water resistance and moisture resistance of the resulting film are reduced.

As pointed out above, in this invention, by incorporating in the bisphenol type epoxy resin a suitable amount of at least one member selected from the group consisting of the additive epoxy resins (1) to (3), each of which has a compatibility with the bisphenol type epoxy resin and a structure similar to that of the bisphenol type epoxy resin but is quite different therefrom in a part of the structure, it is made possible to inhibit arrangement of the bisphenol type epoxy resin molecules, which results in crystallization, and thus prevent crystallization even at low temperatures.

The above-mentioned bisphenol type epoxy resin or its mixture with the above-mentioned additive epoxy resin (1), (2) or (3) is emulsified in water with a non-ionic surface active agent according to customary procedures.

As the non-ionic surface active agent, there can be mentioned, for example, surface active agents of the alkylaryl ether type having an HLB value of 10.9 to 19.5, such as polyoxyethylene nonyl phenyl ether and polyoxyethylene octyl phenyl ether, surface active agents of the alkyl ether type having an HLB value of 10.8 to 16.5, such as polyoxyethylene lauryl ether and polyoxyethylene oleyl ether, surface active agents of the alkyl ester type having an HLB value of 9.0 to 16.5, such as polyoxyethylene laurate, polyoxyethylene oleate and polyoxyethylene stearate, and surface active agents of the polyoxyethylene benzylated phenyl type having an HLB value of 9.2 to 18.

As another means for attaining the object of preventing crystallization, in this invention there can be adopted use of a polyoxyethylene benzylated phenyl ether having the structure and an HLB value of at least 15 as a surface active agent for emulsifying the above bisphenol type epoxy resin or its mixture with the additive epoxy resin in water.

As the polyoxyethylene benzylated phenyl ether, there can be used, for example, such commercially available products as Newcoal 714 (HLB - 15) and Newcoal 723 (HLB = 16.6) (trademarks for products manufactured by Nippon Nyukazai Co., Ltd.), and Emulgen A-500 (HLB = 18) (trademark for the product manufactured by Kao-Atlas Co., Ltd.).

For emulsification of the epoxy resin, the polyoxyethylene benzylated phenyl ether having an HLB value of at least 15 is used in an amount of 0.1 to 20% by weight based on the epoxy resin.

A polyoxyethylene benzylated phenyl ether having an HLB value not exceeding 15 does not have sufficient effect, and even if prevention of crystallization is attained by the use of such ether to some extent, the effect is retained only for about 30 days at longest.

As pointed above, undesired phenomenon of crystallization can be effectively prevented in this invention by adding to the bisphenol type epoxy resin at least one member selected from the group consisting of the above additive resins (1) to (3) having a compatibility with the bisphenol type epoxy resin and a structure similar to that of the bisphenol type epoxy resin but being quite different therefrom in a part of the structure, or by emulsifying the bisphenol type epoxy resin in water with a polyoxyethylene benzylated phenyl ether having an HLB value of at least 15. If the above two means are adopted in combination, the crystallization-preventing effect can be greatly enhanced.

In the composition of this invention, a curing agent should be added in order to cure the above-mentioned epoxy resin. As the curing agent, there can be employed known compounds such as water-soluble and water-dispersible polyamide resins, amine adducts, polyamines and the like.

When it is intended to improve the film-forming property especially under high-humidity conditions, good results are obtained when a polyamide resin prepared from a dimer acid and a polyether diamine, preferably such polyamide resin having an amine value of 250 to 500, is employed as the curing agent.

The dimer acid to be used for forming the above polyamide resin is a product prepared by employing an unsaturated fatty acid having 18 carbon atoms as the starting material, and the product is composed mainly of a dimer acid and includes small amounts of a trimer acid and a monomer acid. As the polyether diamine to be used for forming the above polyamide resin, there can be mentioned, for example,

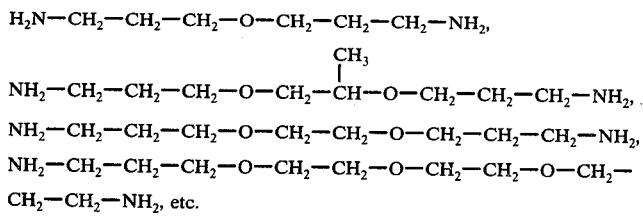

The intended polyamide resin can be obtained by reacting such polyether diamine with the dimer acid at 150° to 250° C. for 1 to 4 hours according to customary procedures.

In this invention, the intended polyamide resin, preferably having an amine value of 250 to 500, can also be prepared by substituting a part of the polyether diamine by one or more of aliphatic amines such as

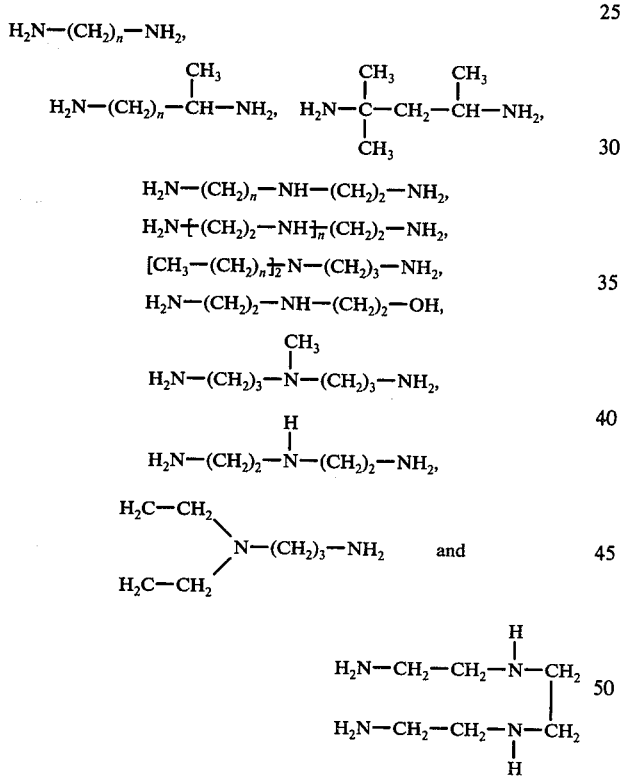

It is preferred that the aliphatic amine be used in an amount of 0.1 to 4 moles per mole of the polyether diamine.

In order to increase the molecular weight of the polyamide resin curing agent, it is possible to add and react a chain extender at the reaction between the dimer acid and polyether diamine or the reaction among the dimer acid, polyether diamine and aliphatic amine. As the chain extender, there can be used, for example, acrylonitrile, methyl methacrylate, formaldehyde, a polyglycol type epoxy resin, a glycerin type epoxy resin or the like. When the so obtained high-molecular-weight polyamide resin, preferably having an amine value of 250 to 500, is used as the curing agent, the resulting composition has very excellent film-forming properties under high-humidity conditions and gives a film very excellent in anti-cracking properties.

Further, an aromatic amine compound can be used in combination with the above polyamide resin. As such aromatic amine compound, the following compounds can be mentioned: (1) Aromatic amines having a structure such as shown below (when these amines are solid at room temperature, they are used in the state melt-mixed with the above polyamide resin or other curing agent mentioned below):

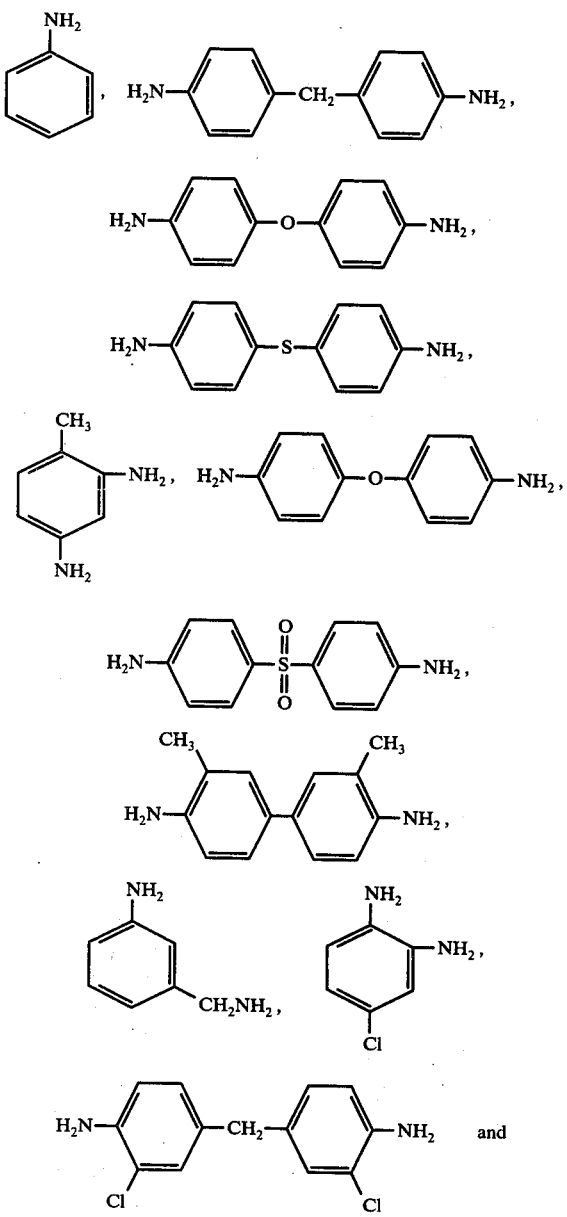

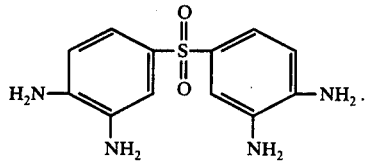

(2) Reaction products between an aromic amine and an epoxy resin obtained according to customary procedures (aromatic amine adducts). (3) Polyamide resins prepared by employing an aromatic amine.

When such aromatic amine compound is used in combination with the above-mentioned polyamide resin curing agent, the moisture resistance, saline dipping resistance and salt spraying resistance are highly improved in the resulting film.

It is preferred that the ratio of the above aromatic amine to the polyamide resin derived from a dimer acid and a polyether diamine be within a range of from 5/95 to 50/50 as expressed in the non-volatile component weight ratio.

The so obtained curing agent or curing agent composition is mixed with an epoxy resin emulsion according to customary procedures to form an aqueous epoxy resin paint composition of this invention.

In this invention, it is preferred that the mixing ratio of the epoxy resin and curing agent be such that the ratio of the epoxy groups to the active hydrogen group is within a range of from 0.5 to 1.5.

The aqueous epoxy resin paint composition of this invention may further comprise additives customarily used in this field, such as organic pigments, inorganic pigments, surface active agents, thickeners and the like.

In case use of a conventional anti-corrosive pigment of the chromate type is restricted because of the toxicity of chromium ions dissolved out of the film, it is preferred that at least one member selected from the group consisting of molybdic acid salts of strontium, calcium, potassium, iron (divalent), barium and ammonium be used instead of the chromate type anti-corrosive pigment.

The molybdate type anti-corrosive pigment is non-toxic and its corrosion resistance is superior or comarable to that of the conventional chromate type anti-corrosive pigment, and it is further characterized in that it promotes the film-forming property of the resulting composition under high-humidity conditions and even when the composition is applied in a large thickness, the curing is accomplished uniformly throughout the film so that the degree of curing does not differ between the surface portion and the interior of the film (this property will hereinafter be referred to as "curing uniformity").

It is preferred that this molybdate type anti-corrosive pigment be incorporated in the paint composition in an amount of 0.1 to 20% by weight. If the amount incorporated of the pigment is smaller than 0.1% by weight, no substantial anti-corrosive effect is obtained and the film-forming property under high-humidity conditions is not promoted. In contrast, if the amount incorporated of the pigment is larger than 20% by weight, the pigment concentration increases and tendency of reduction of physical properties of the film is observed.

In view of the rust-preventive effect and from the economical viewpoint, it is especially preferred that the molybdate type anti-corrosive pigment be incorporated in an amount of 5 to 10% by weight.

It has been found that especially good results are obtained when among the foregoing molybdate type anti-corrosive pigments, strontium molybdate or calcium molybdate obtained by calcining a mixture of molybdenum oxide and calcium carbonate or strontium carbonate at 600° to 800° C. is chosen and used.

In the aqueous epoxy resin paint composition of this invention, at the time of application the main components (the epoxy resin emulsion, the pigment, etc.) are mixed with the curing agent, the mixture is diluted appropriately with water and the resulting dilution can be applied to a substrate to be coated according to customary coating methods, for example, brush-coating, spray-coating and air spray-coating methods. Since the paint composition of this invention has a very high thixotropic property, a thick coating having a thickness of more than 100 μ can be obtained by one coating.

This invention will now be illustrated in more detail by reference to the following Examples, in which all of "parts" and "%" are by weight.

EXAMPLE 1

In a main component comprising 10 parts of red iron oxide, 35 parts of talc, 34 parts of water, 20 parts of a bisphenol type epoxy resin (Epikote 828 having an epoxy equivalent of 190) and 2 parts of polyoxyethylene laurate (Newcol 150 having an HLB value of 10.5 trade mark for the product manufactured by Nippon Nyukazai Co., Ltd.), a portion of the Epikote 828 was replaced by an expoxy resin having a similar structure, which is indicated in Table 1, and it was examined the state of formation and growth of crystals.

As is apparent from the results shown in Table 1, in the components having a composition specified in this invention formation of crystals was not observed for as long as 6 months or more and they had a very excellent storage stability. When a curing agent was incorporated into each of these main components and the paint compositions were applied to a substrate, there were obtained films which were superior or comparable to films formed from ordinary aqueous epoxy resin paints with respect to such properties as the water resistance, chemical resistance, corrosion resistance Table 1

| Sample | Additive Resin Kind | Amount | Epikote 828 | State of Formation and Growth of Crystals[1] | Remarks |
|---|---|---|---|---|---|
| Comparative Sample No. 1 | (methyl-substituted bisphenol epoxy resin) Epiclon 800 (having epoxy equivalent of 195-225) | 1% | 99% | observed (after 10 days) | comparison |
| Sample No. 1 | " | 2% | 98% | not observed | this invention |
| Sample No. 2 | " | 5% | 95% | not observed | this invention |
| Sample No. 3 | " | 10% | 90% | not observed | this invention |
| Comparative Sample No. 2 | (novolak type epoxy resin) Epikote 152 (having epoxy equivalent of 172-179) | 1% | 99% | observed (after 10 days) | comparison |
| Sample No. 4 | " | 10% | 90% | not observed | this invention |

Table 1-continued

| Sample | Additive Resin Kind | Amount | Epikote 828 | State of Formation and Growth of Crystals[1] | Remarks |
|---|---|---|---|---|---|
| Sample No. 5 | (dimer acid type epoxy resin) Epikote 871 (having epoxy equivalent of 390-470) | 10% | 90% | not observed | this invention |

[1] The above main component was placed in a can and the can was sealed and allowed to stand still in a thermostat chamber maintained at 0 to 5° C. for 6 months. Then, the can was opened. The case where glittering crystals were floating on the paint surface is indicated as "observed" and the case where no crystals were formed isindicated as "not observed". The upper portion of the paint in which crystals were formed was ladled out and washed with water, and the residue was examined with a microscope to confirm formation of crystals. (In the subsequent Examples, the state of formation and growth of crystals was examined by the above method.)

and the like.

When a polyamide resin derived from a dimer acid and a polyether diamine, for example, a polyamide resin of an amine value of 350 formed by condensing 1 mole of a dimer acid and 12 moles of $H_2N-(CH_2)_3-O-(CH_2)_3-NH_2$, or a mixture formed by mixing the above polyamide resin at a mixing weight ratio of 1:1 with an amine adduct obtained by reacting a bisphenol type epoxy resin (Epikote 828) and metaphenylene diamine at a mole ratio of 2:1, was used as the curing agent and this curing agent was mixed with the main component so that the epoxy groups in the emulsion and the active hydrogen groups in the curing agent were equivalent to each other, a very excellent film-forming property under high-humidity conditions was attained and a film having excellent chemical and physical properties was obtained.

In compositions shown in Table 1, in order to evaluate the crystallization-preventing effect, the formulation of components was made almost equal in each composition, but it was confirmed that similar results were obtained when other epoxy resins were used or ordinary organic or inorganic pigments or the like were incorporated.

EXAMPLE 2

20 parts of a bisphenol type epoxy resin (DER 331) was emulsified in water with a polyoxyethylene benzylated phenyl ether having an HLB value of 15 (Newcol 714), and 10 parts of red iron oxide and 35 parts of talc were added to the emulsion according to a customary method. The state of formation and growth of crystal in the main component (sample No. 6) was examined. For comparison, a main component (comparative sample No. 3) was prepared in the same manner as above except that polyoxyethylene laurate having an HLB value of 10.5 was used instead of the polyoxyethylene benzylated phenyl ether, and the state of formation and growth of crystals was examined. Results are shown in Table 2.

Table 2

| Sample | State of Formation and Growth of Crystals | Remarks |
|---|---|---|
| Sample No. 6 | not observed | this invention |
| Comparative Sample | observed (crystals were formed after passage of 10 days | comparison |

The curing agent prepared in Example 1 was mixed with the main component of this invention to form an aqueous epoxy resin paint composition. A film obtained from the paint composition has an excellent chemical and physical properties.

EXAMPLE 3

The state of formation and growth of crystals was examined with respect to main components prepared in the same manner as in Example 2 except that a polyoxyethylene benzylated phenol ether having an HLB indicated in Table 3 was used for emulsifying the bisphenol type epoxy resin. Results are shown in Table 3.

Table 3

| Sample | HLB and Trade Name of Surface Active Agent | State of Formation and Growth of Crystals | Remarks |
|---|---|---|---|
| Comparative Sample No. 4 | 9.2 (Newcol 704*) | observed (after 10 days) | comparison |
| Comparative Sample No. 5 | 12.5 (Newcol 707*) | observed (after 20 days) | comparison |
| Sample No. 7 | 15 (Newcol 714*) | not observed | this invention |
| Sample No. 8 | 16.6 (Newcol 723*) | not observed | this invention |
| Sample No. 9 | 18 (Emulgen A-500**) | not observed | this invention |

*Manufactured by Nippon Nyukazai Co., Ltd.
**Manufactured by Kao-Atlas Co., Ltd.

The curing agent prepared in Example 1 was mixed with the each main component of this invention to form an aqueous epoxy resin paint composition. A film obtained from the each paint composition has an excellent chemical and physical properties.

EXAMPLE 4

A methyl-substituted bisphenol resin (Epiclon 800 having an epoxy equivalent of 195 to 225), a novolak type epoxy resin (Epikote 152 having an epoxy equivalent of 172 to 179) or a dimer or trimer acid type epoxy resin (Epikote 871 having an epoxy equivalent of 390 to 470) was incorporated into a bisphenol type epoxy resin (Epikote 828) in an amount indicated in Table 4. 20 parts of the so prepared resin mixture was emulsified in 5 parts of water with a polyoxyethylene benzylated phenyl ether having an HLB value of 16.6. The so obtained emulsion was mixed with a composition comprising 10 parts of red iron oxide, 35 parts of talc and 30 parts of water to form a main component.

The state of formation and crystals was examined with respect to each of the so obtained component to obtain results shown in Table 4.

From the results obtained in Examples 2, 3 and 4, it will readily be understood that in this invention crystallization can be effectively prevented by using a specific surface active agent and this effect can be further enhanced by using an epoxy resin of a specific structure in combination with the bisphenol type epoxy resin.

1 mole of a dimer acid was mixed with 12 moles of a polyether diamine having a structural formula of $H_2N-(CH_2)_3-O-(CH_2)_3-NH_2$, and the mixture was subjected to condensation reaction at 160° C. When the reaction had consumed all water present, the temperature was further elevated to 200° to 250° C and the condensation product was maintained at this temperature for 3 hours, to obtain a polyamide resin of an amine value of 350 to be used as a curing agent.

The so obtained curing agent was incorporated into the main component of the above sample No. 10, 14 or 17 so that the ratio of the epoxy groups to the active hydrogen groups was 1.0. Each paint exhibited a very excellent firm-forming property even when applied under high-humidity conditions and gave a film excellent in both physical and chemical properties.

mixture was reacted under heating to obtain a polyamide resin having an amine value of 442.

The so obtained resin was mixed with the main component prepared in Example 5 at a prescribed mixing ratio (sample No. 22), and the resulting composition Table 4

| Sample | Additive Resin Kind | Additive Resin Amount | Amount of Epikote 828 | State of Formation and Growth of Crystals* | Remarks |
| --- | --- | --- | --- | --- | --- |
| Sample No. 10 | Epiclon 800 | 2% | 98% | not observed | this invention |
| Sample No. 11 | " | 5% | 95% | not observed | this invention |
| Sample No. 12 | " | 10% | 90% | not observed | this invention |
| Sample No. 13 | Epikote 152 | 5% | 95% | not observed | this invention |
| Sample No. 14 | " | 10% | 90% | not observed | this invention |
| Sample No. 15 | " | 15% | 85% | not observed | this invention |
| Sample No. 16 | Epikote 871 | 10% | 90% | not observed | this invention |
| Sample No. 17 | " | 15% | 85% | not observed | this invention |
| Sample No. 18 | " | 20% | 80% | not observed | this invention |

Note:
*The state of formation and growth of crystals was examined after samples were allowed to stand still for 12 months under the same conditions as described in Example 1.

EXAMPLE 5

A main component was prepared by incorporating 10 parts of red iron oxide, 20 parts of talc, 12 parts of calcium carbonate and 30 parts of water into an epoxy resin emulsion comprising 27 parts of a bisphenol epoxy resin (having an epoxy equivalent of 190), 6 parts of a polyoxyethylene benzylated phenyl ether having an HLB value of 12 and 6 parts of water. Then, 12 parts of the polyamide resin curing agent prepared in Example 4 was mixed with 88 parts of the so obtained main component (sample No. 19). The curing property (the degree of hardening observed when the sample was charged into a certain vessel, the vessel was sealed and the sample was allowed to stand still in this state for one week) and film-forming property under high-humidity conditions (degree of curing observed when the sample was applied to the inner surface of a certain vessel, the vessel was sealed and the coated sample was allowed to stand still for one week) were examined to obtain results shown in Table 5.

EXAMPLE 6

In the same manner as described in Example 5, polyamide resins having an amine value of 320 or 290 were prepared by reacting 1 mole of a dimer acid with 10 or 8 moles of a polyether diamine having a structure of

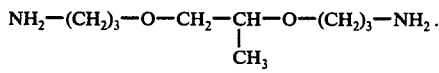

These polyamide resins were mixed with the main component obtained in Example 5 at mixing ratios of 10:90 (sample No. 20) and 15:85 (sample No. 21), respectively. Then, the curing property and film-forming property under high-humidity conditions were examined to obtain results shown in Table 5.

EXAMPLE 7

1 mole of a dimer acid was mixed with 3 moles of a polyether diamine [H₂N(CH₂)₃—O—(CH₂)₃—NH₂] and 7 moles of an aliphatic amine (triethylene tetraamine), and 5 moles of methyl methacrylate and 0.3 mole of a polyglycol type epoxy resin (product manufactured and sold under tradename "Eponitt 014" by Nitto Kasei Co., Ltd.) were added as chain extenders to the mixture. In the same manner as described in Example 4, the was subjected to the above-mentioned comparative tests to obtain results shown in Table 5.

EXAMPLE 8

In the same manner as described in Example 7, polyamide resins were prepared by using components shown below, and each polyamide resin was mixed with the main component prepared in Example 5 and the composition was subjected to the above-mentioned comparative tests to obtain results shown in Table 5.

Sample No. 23

1 mole of a dimer acid, 5 moles of triethylene tetraamine, 3 moles of a polyether diamine

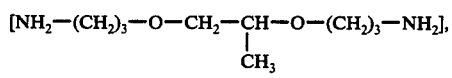

4 moles of methyl methacrylate and 0.25 mole of Eponitt 014.

The obtained polyamide resin has an amine value of 405.

Sample No. 24

1 mole of a dimer acid, 12 moles of a polyether diamine

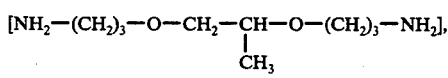

5 moles of methyl methacrylate and 1 mole of a glycerin type epoxy resin (Epikote 812 having an epoxy equivalent of 150 to 170).

The obtained polyamide resin had an amine value of 293.

Sample No. 25:

1 mole of a dimer acid, 10 moles of a polyether diamine [NH₂—(CH₂)₃—O—(CH₂)₃—NH₂], 4 moles of methyl methacrylate and 3 moles of formaldehyde.

The obtained polyamide resin had an amine value of 289.

Sample No. 26

1 mole of a dimer acid, 6 moles of a polyether diamine [NH₂—(CH₂)₃—O—(CH₂)₃—NH₂], 4 moles of triethylene tetraamine, 4 moles of methyl methacrylate and 0.5 mole of Epikote 812.

The obtained polyamide resin had an amine value of 378.

EXAMPLE 9

A bisphenol type epoxy resin (Epikote 828 having an epoxy equivalent of 184 to 194) was reacted with metaphenylene diamine at a mole ratio of 2:1 to obtain an amine adduct.

The amine adduct was used in combination with the polyamide resin obtained in Example 7 at a prescribed mixing ratio (samples No. 27 and No. 28), and the results of comparative tests are shown in Table 6. For comparison, results obtained when the above amine adduct alone was used as the curing agent are also shown in Table 6 (comparative sample No. 6).

EXAMPLE 10

Results obtained when a part of the polyamide resin obtained in Example 7 was replaced by metaphenylene diamine are shown in Table 6 (sample No. 29).

EXAMPLE 11

A dimer acid was reacted with metaphenylene diamine according to a customary method to obtain a polyamide resin. Results obtained when the so obtained resin was used in combination with the polyamide resin obtained in Example 7 at a prescribed mixing ratio (samples No. 30 and No. 31) and results obtained when the above resin prepared from a dimer acid and methaphenylene diamine alone was used as the curing agent (comparative sample No. 7) are shown in Table 6.

For comparison, in the same manner as in Example 7, polyamide resins were prepared from components shown below, and each of the so obtained polyamide resins was mixed with the above-mentioned main component and the resulting composition was subjected to comparative tests to obtain results shown in Table 5.

Comparative Sample No. 8

1 mole of a dimer acid, 10 moles of metaxylene diamine, 4 moles of methyl methacrylate and 0.5 mole of Epikote 812.

The obtained polyamide resin had an amine value of 302.

Comparative Sample No. 9

1 mole of a dimer acid, 15 moles of metaxylene diamine and 4 moles of methyl methacrylate.

The obtained polyamide resin had an amine value of 383.

Comparative Sample No. 10

15 moles of metaxylene diamine, 7 moles of methyl methacrylate and 1 mole of Epikote 812.

The obtained resin had an amine value of 454.

Comparative Sample No. 11

1 mole of a dimer acid and 3 moles of triethylene tetraamine.

The obtained polyamide resin had an amine value of 420.

From the foregoing results of the comparative tests, it will readily be understood that the paint composition of this invention has an excellent film-forming property under high-humidity conditions and it can readily be cured under such conditions where water is present. Accordingly, the paint composition of this invention can provide a film of sufficient properties even when applied in a sealed chamber or on the inner face of a sealed tank.

When the paint composition is applied in an ordinary state (under low-humidity conditions or under a current of air), it can provide a film having properties superior or comparable to those of films prepared from conventional paints.

With respect to the above samples No. 21, No. 25, No. 26, No. 27, No. 28, No. 29, No. 30 and No. 31, a polyoxyethylene benzylated phenyl ether having an HLB value of 16.6 was used for emulsifying the epoxy resin in the water and the above comparative tests were conducted. It was found that in each case a paint of a good storage stability in which no crystals were formed at low temperatures was obtained.

Table 5

| Sample | Main Component/Curing Agent Mixing Ratio | Curing Property of Resulting Paint Composition[1] | Film-Forming Property under High-Humidity Conditions[2] | Remarks |
|---|---|---|---|---|
| Sample No. 19 | 88/12 | good | good | this invention |
| Sample No. 20 | 90/10 | good | good | this invention |
| Sample No. 21 | 85/15 | good | good | this invention |
| Sample No. 22 | 90/10 | good | good | this invention |
| Sample No. 23 | 90.6/9.4 | good | good | this invention |
| Sample No. 24 | 87.4/12.6 | good | good | this invention |
| Sample No. 25 | 86/14 | good | good | this invention |
| Sample No. 26 | 90/10 | good | good | this invention |
| Comparative Sample No. 8 | 88/12 | bad | bad | comparison |
| Comparative Sample No. 9 | 91.4/8.6 | bad | bad | comparison |
| Comparative Sample No. 10 | 92.4/7.6 | bad | bad | comparison |
| Comparative Sample No. 11 | 88.8/11.2 | somewhat good | bad | comparison |

Notes:

[1] After the main component was mixed with the curing agent, a prescribed amount of the resulting composition was immediately charged in a polyethylene cup, and the composition was allowed to stand still in the sealed state for one week. Then, the polyethylene cup was stripped off to separate the inside solid from the vessel. The solid was cut into halves with a knife to examine whether or not the outer portion and the interior of the solid was completely cured. The case where both the outer portion and the interior were completely cured is indicated as "good". The case where the resulting solid was soft and rubber-like is indicated as "bad", and the case where the degree of curing was different between the outer portion and the interior is indicated as "somewhat good".

[2] After the main component was mixed with the curing agent, the composition was applied to the inner face of a metal can and the can was immediately sealed. The coated composition was allowed to stand still in this state for one week. Then, the can was opened and the condition of the film was examined with fingers. The case where no abnormality was felt is indicated as "good", and the case where the film was viscous or it adhered to fingers is indicated as "bad".

Table 6

| Sample | Mixing Weight Ratio[1] | Film-Forming Property under High-Humidity Conditions | Properties of film (150 μ thick film) | | | Remarks |
|---|---|---|---|---|---|---|
| | | | Saline Dipping Test[2] | Salt Spraying Test[3] | Moisture Resistance[4] | |
| Sample No. 22 | — | good | 30 days | 300 hours | 300 hours | this invention |
| Sample No. 27 | 80/20 | good | 60 days | 500 hours | 500 hours | this invention |
| Sample No. 28 | 50/50 | good | 60 days | 500 hours | 500 hours | this invention |
| Sample No. 29 | 80/20 | good | 60 days | 500 hours | 500 hours | this invention |
| Sample No. 30 | 80/20 | good | 60 days | 500 hours | 500 hours | this invention |
| Sample No. 31 | 50/50 | good | 60 days | 500 hours | 500 hours | this invention |
| Comparative Sample No. 6 | 0/100 | bad | not tested because no film was formed | | | comparison |
| Comparative Sample No. 7 | 0/100 | bad | not tested because no film was formed | | | comparison |

Notes:
[1] ratio of (polyamide resin derived from dimer acid and polyether diamine)/(aromatic amine adduct, aromatic amine or polyamide resin formed by employing aromatic amine)
[2] dipped in 3% aqueous solution of NaCl
[3] 5% aqueous solution of NaCl was sprayed at 35° C.
[4] measured at temperature of 50° C. and relative humidity of 100%

EXAMPLE 12

9 parts of red iron oxide, 10 parts of talc, 9 parts of strontium molybdate and 30 parts of water were kneaded. Then, the kneaded mixture was mixed with an epoxy resin emulsion formed by emulsifying 20 parts of a bisphenol type epoxy resin in 7 parts of water with 2 parts of a polyoxyethylene benzylated phenol ether having an HLB value of 16.6 to form a main component.

A polyamide curing agent having an amine value of 320 was prepared by condensing 1 mole of a dimer acid with 10 moles of a polyether diamine [$H_2N-(CH_2)_2-O-(CH_2)_2-(CH_2)_2-NH_2$] at 160° C according to a customary method and reacting the condensate at 200° to 250° C.

The above main component was mixed with the so obtained curing agent at a mixing weight ratio of 90/10 to form a paint composition of this invention. The paint composition was applied to a substrate in a thickness of 150 μ and naturally dried for one week. The resulting film was subjected to various comparative tests to obtain results shown in Table 7.

EXAMPLE 13

An anti-corrosive paint composition was prepared in the same manner as in Example 12 except that a polyamide derived from 1 mole of a dimer acid, 7 moles of triethylene tetraamine and 3 moles of a polyether diamine

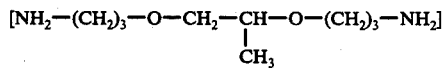

was used as the curing agent, and 7 parts of calcium molybdate and 13 parts of talc were employed.

EXAMPLE 14

In the main component of Example 12, the epoxy resin was replaced by that used in sample No. 12 of Example 4, 5 parts of calcium molybdate was used as the anti-corrosive pigment and the amount of talc was changed to 15 parts. Crystallization at low temperatures was not caused at all in the resulting aqueous epoxy resin emulsion.

A mixture of the polyamide resin obtained in Example 12 with an aromatic amine adduct was used as the curing agent.

The main component was mixed with the curing agent so that the epoxy groups in the emulsion and the active hydrogen atom groups in the curing agent were equivalent to each other. The resulting paint composition was tested to comparative tests to obtain results shown in Table 7.

EXAMPLE 15

In the main component of Example 12, the amount of talc was changed to 13 parts and 5 parts of potassium molybdate was used as the anti-corrosive pigment.

1 mole of dimer acid, 7 moles of triethylene tetraamine, 3 moles of a polyether diamine [$H_2N-(CH_2)_3-O-(CH_2)_3-NH_2$], 5 moles of methylmethacrylate and 0.3 mole of a polyglycol type epoxy resin (Eponitt 014) were reacted in the same manner as in Example 12 to obtain a polyamide resin having an amine value of 442, which was used as a curing agent.

The above main component was mixed with the so obtained curing agent at a mixing weight ratio of 90/10 to obtain an anti-corrosive paint composition.

EXAMPLE 16

An anti-corrosive paint composition was prepared in the same manner as in Example 15 except that 5 parts of barium molybdate was used as the anti-corrosive pigment. The resulting composition was subjected to comparative tests to obtain results shown in Table 7.

EXAMPLE 17

In the main component of Example 12, the epoxy resin was replaced by that used in sample No. 14 of Example 4 and it was mixed with 9 parts of red iron oxide, 15 parts of talc and 2 parts of ammonium molybdate.

20% by weight of the polyamide resin prepared in Example 15 was replaced by an amine adduct obtained by reacting a bisphenol type epoxy resin (Epikote 828) with metaphenylene diamine at a ratio of 1:2, and the resulting mixture was used as a curing agent.

The above main component was mixed with the curing agent so that the epoxy groups in the emulsion and the active hydrogen atom groups in the curing agent were equivalent to each other to obtain an aqueous epoxy resin paint composition.

EXAMPLE 18

An aqueous epoxy resin paint composition was prepared in the same manner as in Example 14 except that the epoxy resin was replaced by that used in sample No. 17 of Example 4, the amount of talc was changed to 15 parts and 5 parts of strontium molybdate was used as an anti-corrosive pigment.

type pigment in respect to the anti-corrosive property, and that the paint composition of this invention is much superior to such Table 7

| Sample | Film-Forming Property under High-Humidity[1] | Results of Comparative Tests | | | | |
|---|---|---|---|---|---|---|
| | | Curing Uniformity of film[2] | Salt Spraying Test[3] | Moisture Resistance[4] | Saline Dipping Test[5] | Water Resistance[6] |
| (This Invention) | | | | | | |
| Example 12 | ◎ | ◎ | ◎ | ◎ | ◎ | ◎ |
| Example 13 | ◎ | ◎ | ◎ | ◎ | ◎ | ◎ |
| Example 14 | ◎ | ◎ | ◎ | ◎ | ◎ | ◎ |
| Example 15 | ◎ | ◎ | ◎ | O | ◎ | ◎ |
| Example 16 | ◎ | ◎ | ◎ | ◎ | ◎ | ◎ |
| Example 17 | ◎ | ◎ | ◎ | ◎ | ◎ | ◎ |
| Example 18 | ◎ | ◎ | ◎ | O | ◎ | ◎ |
| Example 19 | ◎ | ◎ | ◎ | ◎ | ◎ | ◎ |
| Example 20 | ◎ | ◎ | ◎ | ◎ | ◎ | ◎ |
| (Comparisons) | | | | | | |
| Comparative Sample No. 10 | X | X | X | X | Δ | O |
| Comparative Sample No. 11 | X | X | ◎ | ◎ | ◎ | ◎ |
| Comparative Sample No. 12 | X | X | O | O | ◎ | ◎ |

◎: very good,
O: good,
Δ: somewhat bad,
X: bad
Notes:
[1] After the main component was mixed with the curing agent, the composition was applied on the inner face of a certain vessel and the film was allowed to stand still in the sealed state for 7 days. After passage of 7 days, the vessel was opened and the state of the film was examined with the fingers. Namely, it was checked whether the film was sticky or the film adhered to the fingers.
[2] The paint was coated in a thickness of about 1 cm on a substrate, and after passage of 7 days, the film was cut with a knife to examine the curing uniformity.
[3] A 3% aqueous solution of NaCl was sprayed at 35° C. for 500 hours.
[4] The film was allowed to stand still at a temperature of 50° C. and a relative humidity of 100% for 500 hours.
[5] The film was immersed in a 5% aqueous solution of NaCl for 30 days.
[6] The film was immersed in water for 30 days.

anti-corrosive pigment.

EXAMPLE 19

An aqueous epoxy resin paint composition was prepared in the same manner as in Example 12 except that a mixture of 3 parts of strontium molybdate and 5 parts of calcium molybdate was used as an anti-corrosive pigment.

EXAMPLE 20

An aqueous epoxy resin paint composition was prepared in the same manner as in Example 12 except that 9 parts of iron (divalent) molybdate was used as an anti-corrosive pigment.

COMPARISONS

Comparative Sample No. 10

The aqueous epoxy resin emulsion of Example 12 was mixed with 16 parts of talc and 9 parts of red iron oxide to form a main component, which was then mixed with an ordinary aliphatic amine adduct as a curing agent, to obtain a paint composition.

Comparative Sample No. 11

The aqueous epoxy resin emulsion of Example 12 was mixed with 9 parts of red iron oxide, 10 parts of talc, 10 parts of strontium chromate and 30 parts of water to form a main component, which was then mixed with the same curing agent as used in comparative sample No. 10, to obtain an anticorrosive paint composition.

Comparative Sample No. 12

The aqueous epoxy resin emulsion of Example 12 was kneaded with 9 parts of red iron oxide, 10 parts of talc, 10 parts of zinc borate and 30 parts of water to form a main component, which was then mixed with the same curing agent as used in comparative sample No. 10, to obtain a paint composition.

From the foregoing results of the comparative tests, it will readily be understood that the paint composition of this invention is superior or comparable to paint compositions comprising a conventional strontium chromate conventional paint compositions in the film-forming property under high-humidity conditions and the curing uniformity.

What is claimed is:

1. An aqueous epoxy resin paint composition comprising an epoxy resin emulsion formed by emulsifying in water (A) 98 to 50% by weight of a bisphenol type epoxy resin and (B) 2 to 50% by weight novolak type epoxy resins, with a non-ionic surface active agent, and a curing agent incorporated in said epoxy resin emulsion.

2. An aqueous epoxy resin paint composition as set forth in claim 1 wherein the non-ionic surface active agent is a polyoxyethylene benzylated phenyl ether having an HLB value of at least 15.

3. An aqueous epoxy resin paint composition as set forth in claim 1 wherein the curing agent is a polyamide resin derived from a dimer acid and a polyether diamine.

4. An aqueous epoxy resin paint composition as set forth in claim 1 wherein the curing agent is a mixture, the major part of which is a polyamide resin derived from a dimer acid and a polyether diamine and the minor part of which is an aromatic amine compound.

5. An aqueous epoxy resin paint composition as set forth in claim 1 wherein the curing agent is a mixture, the major part of which is a polyamide resin derived from a dimer acid, polyether diamine and a component selected from the group consisting of chain extender, an aliphatic amine and mixtures and the minor part of which is an aromatic amine compound.

6. An aqueous epoxy resin paint composition as set forth in claim 1 which further comprises 0.1 to 20% by weight of at least one member selected from the group consisting of molybdic acid salts of strontium, calcium, potassium, iron (divalent), barium and ammonium.

7. An aqueous epoxy resin paint composition which comprises an epoxy resin emulsion formed by emulsifying a mixture comprising (A) 98 to 50% by weight of a bisphenol type epoxy resin and (B) 2 to 50% by weight of novolak type epoxy resins in water with a polyoxyethylene benzylated phenyl ether having an HLB value of at least 15, and a curing agent which is a polyamide resin derived from a dimer acid and a polyether diamine.

* * * * *